United States Patent
Reeves et al.

(10) Patent No.: US 9,125,013 B1
(45) Date of Patent: Sep. 1, 2015

(54) METHODS AND SYSTEMS FOR MODIFYING A PREFERRED ROAMING LIST (PRL) OF A WIRELESS COMMUNICATION DEVICE

(71) Applicant: Sprint Spectrum L.P., Overland Park, KS (US)

(72) Inventors: Raymond E. Reeves, Oviedo, FL (US); Simon Youngs, Overland Park, KS (US); Mark D. Peden, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 147 days.

(21) Appl. No.: 13/773,249

(22) Filed: Feb. 21, 2013

(51) Int. Cl.
*H04W 4/00* (2009.01)
*H04W 8/02* (2009.01)
*H04W 12/06* (2009.01)
*H04L 12/70* (2013.01)
*H04W 12/12* (2009.01)

(52) U.S. Cl.
CPC ......... *H04W 8/02* (2013.01); *H04L 2012/5607* (2013.01); *H04W 12/06* (2013.01); *H04W 12/12* (2013.01)

(58) Field of Classification Search
CPC ..... H04W 12/12; H04W 12/06; H04W 8/183; H04W 60/00; H04W 35/30; H04W 80/04; H04W 84/12; H04L 2012/5607
USPC .......... 455/410–411, 432.1–432.3, 455/435.1–435.3, 436; 370/310.2, 328, 370/331–334, 338
See application file for complete search history.

(56) References Cited

U.S. PATENT DOCUMENTS

| | | | | |
|---|---|---|---|---|
| 6,052,596 | A * | 4/2000 | Barnickel | 455/450 |
| 6,993,336 | B2 * | 1/2006 | Aerrabotu et al. | 455/437 |
| 7,489,930 | B2 * | 2/2009 | Aerrabotu et al. | 455/439 |
| 7,813,721 | B2 * | 10/2010 | Kim | 455/414.1 |
| 7,894,812 | B1 * | 2/2011 | Durig et al. | 455/432.3 |
| 8,249,498 | B1 | 8/2012 | Pulugurta | |
| 2003/0134637 | A1 * | 7/2003 | Cooper | 455/432 |
| 2004/0198350 | A1 * | 10/2004 | Aerrabotu | 455/432.1 |
| 2004/0203745 | A1 * | 10/2004 | Cooper | 455/432.1 |
| 2005/0227688 | A1 * | 10/2005 | Li et al. | 455/432.1 |
| 2009/0086691 | A1 * | 4/2009 | Balasubramanian | 370/338 |
| 2010/0311402 | A1 * | 12/2010 | Srinivasan et al. | 455/418 |

* cited by examiner

*Primary Examiner* — Steve D Agosta

(57) ABSTRACT

Methods and systems for modifying a preferred roaming list (PRL) of a subscriber user equipment (UE) are provided. In a wireless communication system, a first wireless service provider is associated with a first radio access network (RAN) and maintains a subscriber account associated with a given UE. When the first RAN receives a registration request from the UE, the first RAN responsively (i) attempts to authenticate the UE, and (ii) upon a failure to authenticate the UE, the first RAN updates the PRL to then list a second RAN associated with a second wireless service provider as the highest priority network in the PRL.

6 Claims, 4 Drawing Sheets

ACQUISITION TABLE — 302

| FREQUENCY | FREQUENCY INDEX |
|---|---|
| $FREQ_1$ | $F\text{-}INDEX_1$ |
| $FREQ_2$ | $F\text{-}INDEX_2$ |
| *** | *** |
| $FREQ_n$ | $F\text{-}INDEX_n$ |

SYSTEM TABLE — 304

| SYSTEM | FREQ-INDEX | PREF | SYSTEM TYPE | ROAM FLAG | ASSOC. SYSTEM | ASSOC. INDEX |
|---|---|---|---|---|---|---|
| SID_NID_1  | $F\text{-}INDEX_1$ | 1  | 1xRTT | No  | Yes | 7 |
| SID_NID_2  | $F\text{-}INDEX_1$ | 2  | 1xRTT | No  | Yes | 3 |
| SID_NID_3  | $F\text{-}INDEX_1$ | 3  | EV-DO | Yes | No  | - |
| SID_NID_4  | $F\text{-}INDEX_1$ | 4  | 1xRTT | No  | No  | - |
| SID_NID_5  | $F\text{-}INDEX_1$ | 5  | EV-DO | No  | Yes | 7 |
| SID_NID_6  | $F\text{-}INDEX_1$ | 6  | EV-DO | No  | Yes | 3 |
| SID_NID_7  | $F\text{-}INDEX_1$ | 7  | 1xRTT | No  | No  | - |
| SID_NID_8  | $F\text{-}INDEX_1$ | 8  | 1xRTT | No  | No  | - |
| SID_NID_9  | $F\text{-}INDEX_1$ | 9  | 1xRTT | No  | No  | - |
| SID_NID_10 | $F\text{-}INDEX_1$ | 10 | 1xRTT | No  | No  | - |
| SID_NID_11 | $F\text{-}INDEX_1$ | 11 | EV-DO | Yes | No  | - |
| SID_NID_12 | $F\text{-}INDEX_1$ | 12 | EV-DO | Yes | No  | - |

Fig. 3

METHODS AND SYSTEMS FOR MODIFYING A PREFERRED ROAMING LIST (PRL) OF A WIRELESS COMMUNICATION DEVICE

BACKGROUND

Unless otherwise indicated herein, the materials described in this section are not prior art to the claims and are not admitted to be prior art by inclusion in this section.

A wireless service provider typically operates a radio access network (RAN) that includes a number of base stations that radiate to define one or more wireless coverage areas, such as cells and cell sectors, in which user equipment (UE), such as cell phones, tablet computers, tracking devices, embedded wireless modules, and other wirelessly equipped communication devices can operate. In turn, each base station may be coupled with network equipment that provides connectivity with one or more transport networks, such as the public switched telephone network (PSTN) and/or the Internet, as examples. With this arrangement, a UE operating within the coverage of the RAN may engage in air-interface communication with a base station, and may thereby communicate via the base station with various remote network entities, and/or with other UEs served by the base station and/or the RAN.

In general, a cellular wireless system may operate in accordance with a particular air-interface protocol or radio access technology, with communications from the base stations to UEs defining a downlink or forward link and communications from the UEs to the base stations defining an uplink or reverse link. Examples of existing air-interface protocols include, without limitation, Code Division Multiple Access (CDMA) (e.g., 1xRTT and 1xEV-DO), Long Term Evolution (LTE), WiMAX, iDEN, TDMA, AMPS, Global System for Mobile Communications (GSM), GPRS, UMTS, EDGE, MMDS, Wi-Fi, and Bluetooth®.

A UE typically stores a "preferred roaming list" (PRL), which includes a prioritized listing of communication systems (such as RANs) that the UE may access. In practice, each available communication system may emit a pilot signal (or the like) that uniquely identifies the system. For each system listed in the PRL, the PRL may specify corresponding access data, such as radio frequency and system/network identification codes. Using that data, the UE may then search for a system (i.e., scan the airwaves in search of a system) in the order that the systems are listed in its PRL, and may then attempt to register with the highest priority system it finds, proceeding down its PRL until achieving system acquisition.

A PRL may take any of a variety of forms. For example, a rudimentary PRL may take the form of a flat file or data table in which each entry corresponds with a respective system and indicates a radio frequency and system/network identifier for the system.

More typically, a PRL will include a separate "acquisition table" and "system table." The acquisition table may list frequencies to be scanned for allowed systems, and the system table may then provide a priority-ordered listing of allowed systems, specifying for each system an associated system identifier and/or network identifier. In CDMA systems, for instance, each system table entry usually specifies a respective "system identification code" (SID) and "network identification code" (NID), and each CDMA base station broadcasts its SID and NID in system-overhead messages. Thus, when a UE detects an allowed SID-and-NID combination on an expected carrier frequency, the UE may connect to the identified system.

A typical PRL may also specify other information for each allowed system. For instance, each entry in a system table may include an indication of whether the system is a "roaming" system, i.e., one accessible through an inter-carrier roaming agreement, and an indication of the geographical region in which the system is located.

Still further, some PRLs may group access systems according to their geographic regions, in order to allow a UE to find the most preferred system in the UE's current geographic region. With such a PRL, for instance, once a UE determines its geographic region (such as by detecting any pilot signal identified in its PRL as being in the region), the UE may then search for a system among those that the PRL lists in that region, in the order listed (e.g., in descending order of the PRL-indicated priority).

In practice, an initial or default PRL is often loaded into a UE before a wireless service provider distributes the UE to a subscriber. This initial PRL is typically provisioned by the wireless service provider to list with the highest priority the communication systems associated with the wireless service provider.

Overview

In operation, a UE may attempt to register with a communication system associated with its wireless service provider network, which is listed with the highest priority in its PRL (e.g., with the highest priority in its PRL for the UE's current geographic region). If the UE is not authenticated to receive service from its wireless service provider network, however, the continuous attempts to register into coverage will consume network traffic channel resources even though registration or authentication will ultimately fail. Such continuous registration attempts may cause a communication channel (e.g., a shared air-interface access channel for receiving access (e.g., registration requests)) of its wireless service provider network to become overloaded, which can create issues with network performance.

Disclosed herein are methods and systems for modifying the PRL of a subscriber UE. As disclosed, in response to a triggering event (such as receiving a registration request from a UE that is flagged as unauthorized or that is not authenticated at that time to receive service from its wireless service provider), a wireless service provider will update the PRL of the UE such that the PRL then lists a RAN of another wireless service provider as the highest priority network in the PRL.

Advantageously, changing the order in which the UE searches for an available access system from among those listed in its PRL frees up RF-access-channel resources while still allowing the wireless service provider to maintain control (e.g., the processing of authentication requests initiated by the UE and received via another carrier) over the unauthorized UE. For example, the wireless service provider could at some point authenticate the unauthorized UE and deliver a message to the UE, perhaps with a business offer related to a resumption of service, among many possible examples.

For example, in one respect, disclosed is a wireless communication system in which a UE has an account with a first wireless service provider and is provisioned with a PRL. The first wireless service provider is associated with a first RAN. The first RAN receives a registration request from the UE, and in response, the first RAN (i) attempts to authenticate the UE, and (ii) upon a failure to authenticate the UE, the first RAN updates the PRL to then list a second RAN associated with a second wireless service provider as the highest priority network in the PRL. The first RAN may update the PRL by provisioning the UE with a new PRL, or may update the PRL by sending instructions to the UE to modify its PRL, among other options. In one example embodiment, the update to the PRL comprises the first RAN simply being removed from being listed in the PRL. In another example embodiment, the update to the PRL includes the first RAN remaining listed in the PRL, but the priority associated with the second RAN is changed to be higher than the priority associated with the first RAN.

In another respect, disclosed is a UE comprising a user interface, a radio for establishing a first wireless communication link between the UE and a communication network, a processor, and a data storage having stored therein a PRL. The UE also includes program instructions executable by the processor to send a registration request via the radio to a first RAN associated with a first wireless service provider that maintains a subscriber account associated with the UE, and to thereafter receive a PRL update that causes the UE to then have an updated PRL that lists a second RAN associated with a second wireless service provider as the highest priority network in the PRL. In this example, the UE is not associated with a subscriber account with the second wireless service provider.

In yet another respect, disclosed is a non-transitory machine readable medium having stored thereon instructions executable by a processing unit to carry out various functions so as to update a PRL of a UE. By way of example, the functions may include receiving via a first RAN a UE registration request, wherein the first RAN is associated with a first wireless service provider, which maintains a subscriber account associated with the UE. Further, the functions may include in response to receiving the registration request, updating a PRL of the UE to then list a second RAN associated with a second wireless service provider as the highest priority network in the PRL.

These as well as other aspects, advantages, and alternatives will become apparent to those of ordinary skill in the art by reading the following detailed description, with reference where appropriate to the accompanying drawings. Further, it should be understood that the descriptions provided in this summary and below are intended to illustrate the invention by way of example only and not by way of limitation.

BRIEF DESCRIPTION OF THE DRAWINGS

FIG. 3 depicts an example preferred roaming list (PRL), which may be used in accordance with at least one embodiment.

DETAILED DESCRIPTION

Figure 1:
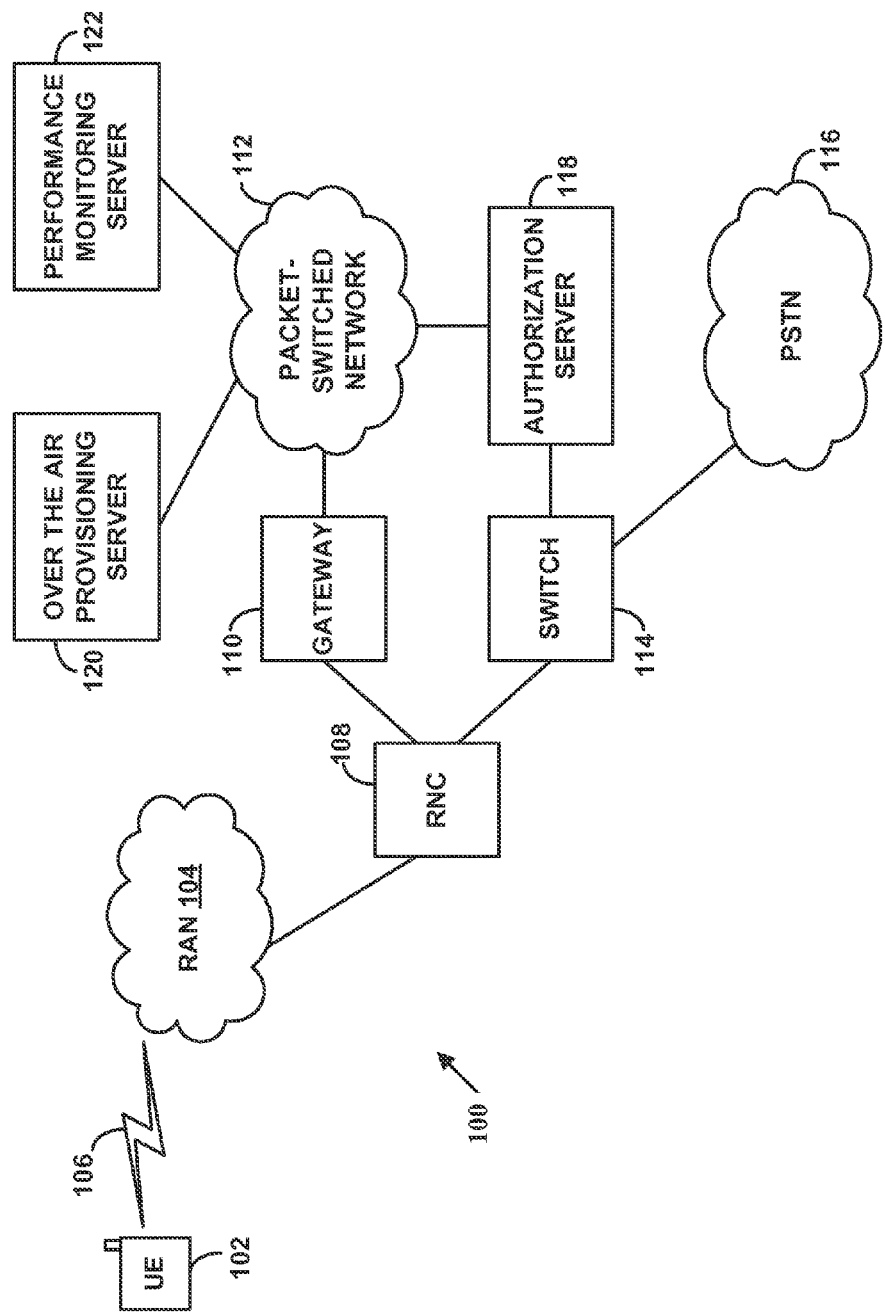
FIG. 1 is a simplified block diagram of an example communication system in which at least one embodiment can be implemented.

The present method may be implemented by a communication system comprising a RAN that is operated by a wireless service provider and that is arranged to serve UEs with wireless communication service. FIG. 1 is a simplified block diagram of such an example communication system. It should be understood, however, that this and other arrangements and processes described herein are set forth for purposes of example only, and that other arrangements and elements (e.g., machines, interfaces, functions, orders of elements, etc.) can be added or used instead and some elements may be omitted altogether. Further, those skilled in the art will appreciate that many of the elements described herein are functional entities that may be implemented as discrete components or in conjunction with other components, in any suitable combination and location.

As shown in FIG. 1, the communication system 100 includes by way of example a representative user equipment (UE) 102 and a representative radio access network (RAN) 104, which may include a number of base stations that function to provide UEs such as UE 102 with wireless coverage and in turn connectivity with one or more transport networks.

As shown in FIG. 1, RAN 104 radiates to provide a coverage area defining an air interface 106 through which to exchange control and bearer data with UEs. RAN 104 is capable of communicating over air interface 106 with multiple UEs, such as UE 102, using a wireless communication protocol such as CDMA. Other example protocols, as discussed above, may be Long Term Evolution (LTE), WiMAX, iDEN, TDMA, AMPS, Global System for Mobile Communications (GSM), GPRS, UMTS, EDGE, MMDS, Wi-Fi, and Bluetooth®.

Base stations within the RAN 104 may be coupled with a radio network controller (RNC) 108 that functions to control various aspects of RAN operation and various aspects of air-interface operation, such as handoffs of UEs between base stations, and the like. RNC 108 is then coupled with a gateway 110, such as a packet data serving node (PDSN), that provides connectivity with a packet-switched network 112, which may be a core packet network operated by the wireless service provider or may be the Internet, among other examples. RNC 108 is also coupled with a switch 114, such as a mobile switching center (MSC), that provides connectivity with a public switched telephone network (PSTN) 116.

An authorization server 118, an over-the-air provisioning (OTAP) server 120, and a performance monitoring server 122 are further shown as nodes on the packet-switched network. Each of these servers may comprise one or more processors and associated components arranged to carry out various functions as described.

Generally, authorization server 118 functions to maintain or manage records of UEs that are authorized or authenticated to be served with wireless communication service by the wireless service provider. This includes UEs that are associated with active service accounts of users who subscribe to service with the wireless service provider (i.e., UEs that subscribe to service with the wireless service provider). Further, this may include other UEs that are for one reason or another authorized to be served by the wireless service provider.

When any such UE is authorized to be served by the wireless service provider, authorization server 118 may be directed to establish or update a record or account for the UE to indicate that that UE is authorized and should be allowed to access the network. Further, when a UE that is currently authorized to be served by the wireless service provider becomes unauthorized (because, e.g., its associated subscriber account with the wireless service provider is terminated), authorization server 118 may be directed to update the account for the UE to indicate that the UE is no longer authorized and therefore should not be allowed to access the network. A UE may become unauthorized for various reasons, such as non-payment of required fees, engaging in denial-of-service attacks, or continuously attempting to register notwithstanding being inactive, for example. Other examples may also exist.

OTAP server 120 functions to provide UEs with new and updated program logic and associated data, such as PRLs, firmware, telephone number assignments, server addresses, and the like. OTAP server 120 may send such data to UEs as packet-data, after first sending signaling messages (e.g., Short Messaging Service (SMS) messages) to cause the UEs to acquire wireless packet-data connectivity. Alternatively, OTAP server 120 may send the data to the UEs in other ways, such as in one or more SMS messages for example. Preferably, each UE that is arranged to be served by the wireless service provider is programmed with core OTAP logic to be able to receive such OTAP communications and to store or otherwise implement the updates provided.

In normal operation, when a UE subscribes to service with the wireless service provider, the UE may register with the wireless service provider whenever the UE enters into coverage of the wireless service provider's RAN, or when the UE moves from one coverage area to another, among other instances. For example, when a UE enters into the coverage area of a base station, the UE may detect a pilot signal being broadcast by the station on a forward-link pilot channel in the coverage area. In response, the UE may transmit a registration request in an access probe to the base station on a reverse-link access channel. If the transmission of the access probe is not successful, the UE may repeatedly retransmit the access probe.

Upon successful receipt of the access probe, a base station within RAN 104 may forward the registration request to RNC 108, which may in turn forward the request to switch 114. Switch 114 may then communicate with authorization server 118 to determine whether the UE seeking authorization is indeed authorized to be served with wireless communication service. If so, the switch may send a registration-success message in response to the UE, and the RAN 104 may update its records to indicate that the UE is currently operating in its coverage area or generally within the coverage area of switch 114, to facilitate later communications to the UE.

The process of a UE transmitting a registration request to the base station, which then forwards the request to the RNC, consumes valuable radio-frequency (RF) access-channel resources for the particular wireless service provider with which the UE is attempting to communicate. If the UE is unauthorized for service with the wireless service provider, such transmitted registration requests will inevitably fail, and thus the related consumption of RF-access-channel resources is wasteful for the wireless service carrier, and may come at the expense of the wireless service provider using its RF-access-channel resources for other UEs that are authorized to receive wireless communication service.

In one example embodiment, the OTAP server 120 may store a threshold number corresponding to the number of failed registration requests that are allowed from an unauthorized UE. Once the threshold number of failed registration request is met, the OTAP server 120 may execute instructions to provision the PRL of the UE with an updated PRL in accordance with the methods disclosed herein and certainly other entities could maintain and/or enforce such a threshold.

Performance monitoring server 122 may function to collect and manage performance monitoring metrics reported by UEs. These UEs may collect performance-monitoring data (e.g., RF signal strength per location and/or call block/drop event data) and send that data to the performance monitoring server 122. Through automated and/or manual analysis of that data, the wireless service provider may then determine that RF-performance issues exist in one location or another in the carrier's network, and may responsively take action to improve performance.

In one example embodiment, if performance monitoring server 122 indicates to the wireless service provider that RF-performance issues exist for a coverage area of a particular RAN, the wireless service provider may relay that information to the OTAP server 120, which will use that information as a trigger to send instructions to unauthorized UEs operating in that particular RAN to update their PRLs in accordance with the methods disclosed herein.

Figure 2:
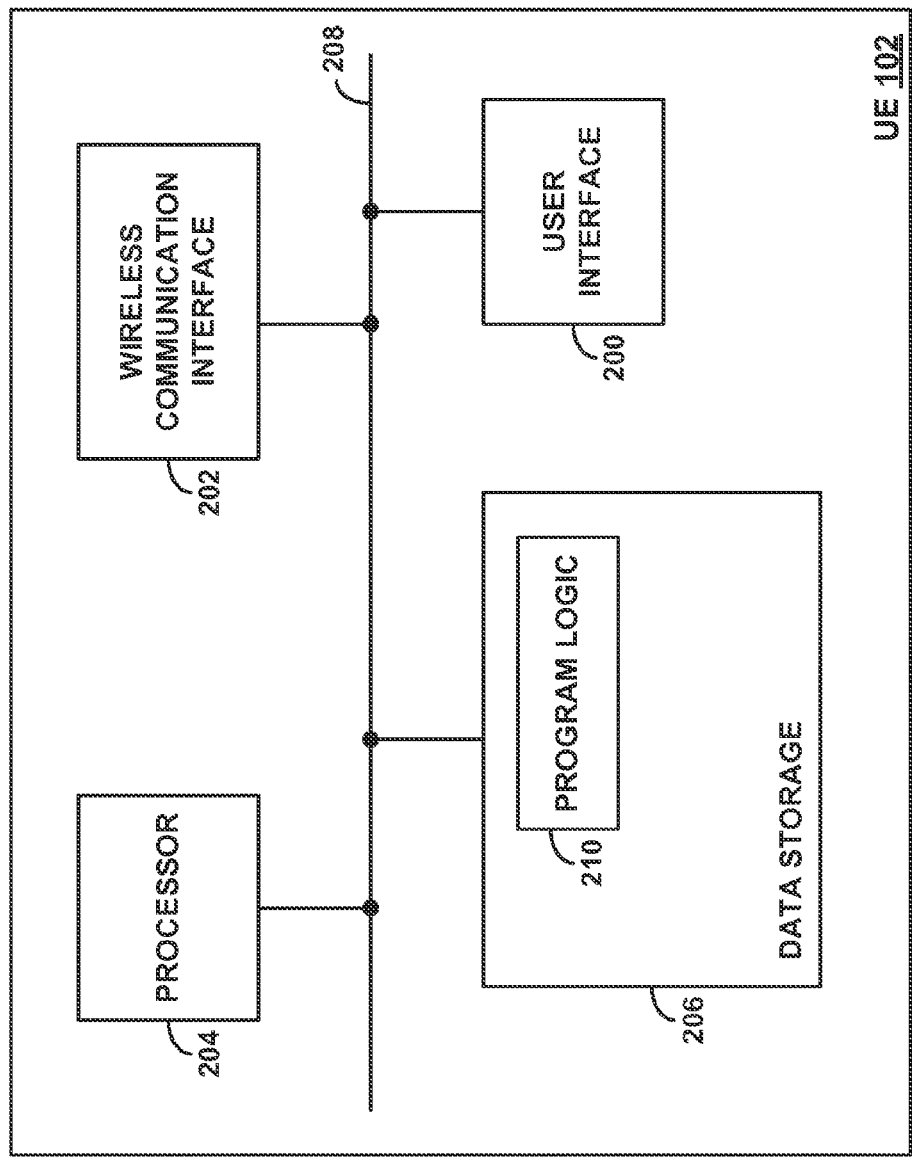
FIG. 2 is a simplified block diagram of an example user equipment (UE), which may be used in accordance with at least one embodiment.

FIG. 2 is a simplified block diagram of an example UE, which may be used in accordance with one or more embodiments. In particular, FIG. 2 depicts UE 102 of FIG. 1. As shown in FIG. 2, UE 102 includes a user interface 200, a wireless communication interface 202, a processor 204, and data storage 206, all of which may be communicatively linked by a system bus 208. In general, UE 102 may be any device arranged to communicate over air interfaces with RANs, and carry out the functions described herein. In this example, UE 102 is a mobile station.

User interface 200 facilitates interaction with a user of the UE, if applicable. As such, user interface 200 may include one or more mechanisms for receiving input from users, and one or more mechanisms for communicating outputs to users. For example, the user interface may include input components such as a keyboard, a touch-screen, a microphone, and a camera, and output components such as a display screen, a loud speaker, and a headset interface. Any other mechanisms now known or later developed for receiving inputs and communicating outputs may be used as well.

Wireless communication interface 202 provides for wireless communication with base stations according to an agreed air-interface protocol, and may also enable UE 102 to detect pilot signals indicating the existence of wireless coverage.

Processor 204 may control many operations of UE 102 by executing a set of program instructions stored in data storage 206, and may comprise multiple (e.g., parallel) processors, such as a general-purpose microprocessor and/or a discrete digital-signal processor. Processor 204 may be integrated in whole or in part with wireless communication interface 202 or with other aspects of the UE.

Data storage 206 comprises one or more volatile and/or non-volatile storage components, such as magnetic, optical, or organic storage, and may be integrated in whole or in part with processor 204. Data storage 206 of the UE may include program logic 210 executable by processor 204 to carry out various UE functions described herein. As such, data storage 206 may receive instructions to update the PRL of UE 102.

FIG. 3 is an example (though simplified) PRL 300, which may be used in accordance with one or more embodiments. PRL 300 is of the type that may be stored in a UE, such as UE 102. As noted above, a PRL such as PRL 300 can be loaded onto UE 102 at the time of manufacture or distribution of the UE or later through over-the-air provisioning of the UE, in a manner well known in the art. Further, the PRL can take forms other than that shown. In addition, note that UE 102 could be programmed with a prioritized network-acquisition order in some way other than with a traditional PRL.

As shown in FIG. 3, the exemplary PRL 300 includes two tables, an acquisition table 302 and a system table 304. Acquisition table 302 lists a number of carrier frequencies, $FREQ_1$, $FREQ_2$, . . . , $FREQ_n$, on which allowed wireless access systems operate and specifies a frequency index number respectively for each frequency. System table 304, in turn, lists allowed wireless access systems in a priority search order, i.e., in an order in which UE 102 is to search for (and attempt to acquire) the wireless access systems until the UE 102 successfully acquires one.

As shown more particularly in FIG. 3, each row of system table 304 corresponds with a respective wireless access system and includes a number of columns or fields that designate parameter values or attributes of the system. In this example, the first parameter values for each system are a SYSTEM ID/NETWORK ID (SID_NID), and a FREQUENCY INDEX, with the FREQUENCY INDEX corresponding with a carrier frequency listed in the acquisition table 302. (In this example, all systems have the same frequency.) Cooperatively, these three values uniquely identify each wireless access system in the example PRL and allow UE 102 to detect the presence of any of the wireless access systems. In particular, for each wireless access system, a serving base station may emit a pilot signal on the designated carrier frequency, and the pilot signal may carry the SID and NID of the system. Thus, by scanning the airwaves on a specific frequency, the device can receive and resolve a pilot signal, determine that the pilot signal carries a particular SID/NID combination, and conclude that the pilot signal denotes the presence of a specific wireless access system.

Beyond the exemplary SID_NID, and FREQUENCY INDEX parameters for each system, system table 304 may also include a number of other parameter values for each listed system. As shown, for instance, system table 304 includes for each system a SYSTEM TYPE indication, a ROAM flag, an ASSOCIATED SYSTEM flag, and an ASSOCIATION INDEX.

The SYSTEM TYPE indication in this example specifies the air-interface protocol of the system. Specifically, the SYSTEM TYPE specifies for each system whether the system operates under the 1xRTT protocol or under the EV-DO protocol.

The ROAM flag for each system indicates whether the system is operated by the primary carrier that serves UE 102 or whether the system is operated by another carrier and can be used only pursuant to an inter-carrier roaming agreement, sometimes at a higher cost. Once UE 102 registers with a given system, the UE may decide based on the system's ROAM flag whether to present a "roaming" indicator to a user that the device is roaming.

The ASSOCIATED SYSTEM flag for a given system indicates whether an "associated" system exists. In this regard, an associated system may be another wireless access system that is substantially co-located with the given system, such that a UE served by one system can alternatively access the other system. EV-DO systems, for instance, are often implemented as overlay systems on top of legacy 1xRTT systems, with a common base station serving both 1xRTT and EV-DO subscribers. Thus, the ASSOCIATED SYSTEM flag for a 1 xRTT system may indicate that an overlay EV-DO system exists, and the ASSOCIATED SYSTEM flag for an EV-DO system may indicate the EV-DO system is an overlay on at least one 1xRTT system.

The ASSOCIATION INDEX may then specify correspondence between associated systems. For instance, associated 1xRTT and EV-DO systems may have the same ASSOCIATION INDEX. In typical practice, when the UE discovers the presence of a 1xRTT system and registers with the 1xRTT system, the UE may then also search for and register with an associated overlay EV-DO system. The UE may then effectively operate in both systems concurrently, using 1xRTT for legacy communications and EV-DO for higher-speed data communications for instance.

PRL 300 lists allowed wireless access systems in a specific priority order (indicated by a PREF value in the system table), which defines the default order in which UE 102 is to search for an available wireless access system from among those listed. Applying the basic PRL as shown, for instance, UE 102 will first scan the airwaves in search of a pilot from the first listed system, SID_NID_1, and if the device does not find that system, it will then search the airwaves in search of a pilot from the next listed system, SID_NID_2. The UE will continue in this manner until it finds a system or until it exhausts the list. Once the UE finds a system, the UE will register with the system (if the UE is not already registered with the system). Further, upon finding a system or exhausting the list, the UE may then repeat the process, beginning once again by searching for the first (highest priority) system on the list.

As explained above, a typical PRL may group wireless access systems geographically. For that purpose, the system table may also include a region code for each system, indicating the geographic region in which the system is located. That way, once a device finds a wireless access system that is in a given geographic region, the device can then apply the portion of the PRL that lists systems in that region, in an effort to find the highest priority system that it can find in that region. For simplicity, the example PRL 300 of FIG. 3 does not show geographic indications; thus all of the wireless access systems shown in the PRL can be assumed to be in a common geographic region.

Figure 4:
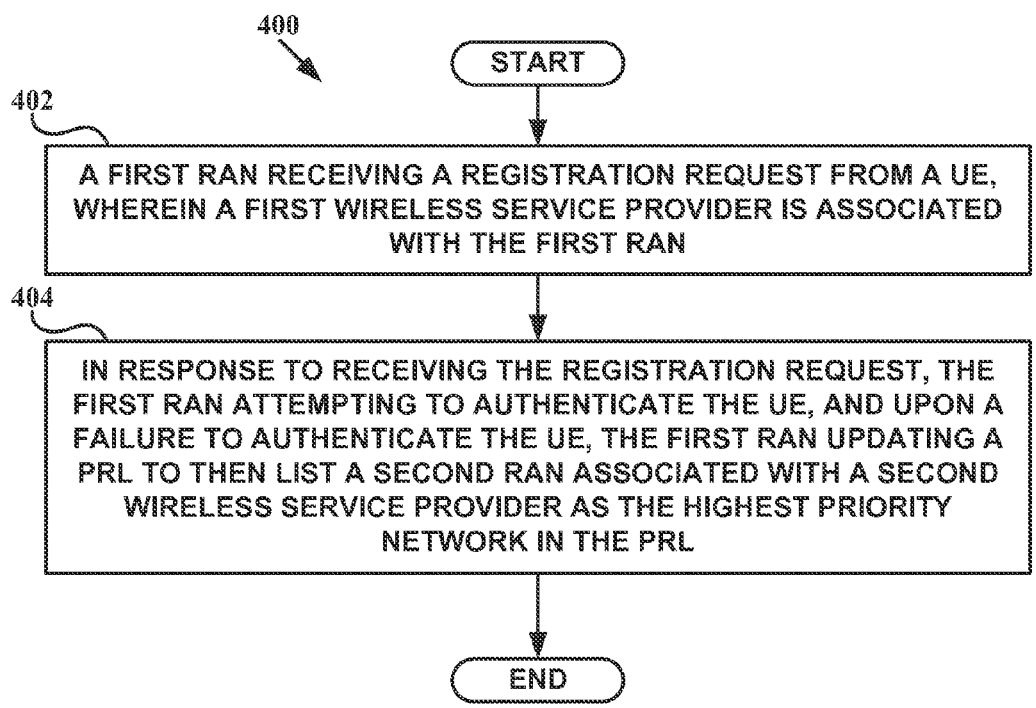
FIG. 4 is a flow chart depicting functions that can be carried out in accordance with an example method.

In accordance with an embodiment, program logic 210 is executable to update the PRL of UE 102 or more generally to change the priority order in which UE 102 searches for an available wireless access system from among those listed in the PRL. FIG. 4 is a flow chart depicting an example of this process.

FIG. 4 is a flow chart depicting functions that can be carried out in accordance with an example method 400. The method 400 assumes that a RAN operated by a wireless service provider is arranged to serve a plurality of subscriber UEs that subscribe to service from the wireless service provider.

At block 402, a first RAN receives from a UE a registration request. The first RAN is associated with a first wireless service provider. The UE is associated with a subscriber account with the first wireless service provider and is provisioned with a PRL. The PRL may take on any of the forms discussed above, and may be a PRL such as PRL 300 of FIG. 3, comprising a listing ranking priorities of a plurality of RANs respectively associated with a plurality of wireless service providers. In one embodiment, the UE is provisioned by the first wireless provider with a PRL upon activation of its account with the first wireless service provider in the manner discussed above. As such, the PRL may initially list RANs associated with the first wireless service provider (such as the first RAN in the present example) with a higher priority than RANs associated with other wireless service providers.

At block 402, in response to receiving the registration request, the first RAN (i) attempts to authenticate the UE, and (ii) upon a failure to authenticate the UE, the first RAN updates the PRL to then list a second RAN associated with a second wireless service provider as the highest priority network in the PRL. In the example method of FIG. 4, the UE is not associated with a subscriber account with the second wireless service provider.

Thereafter the UE may scan its updated PRL and accordingly transmit registration requests to the highest priority network found; in the example of method 400, this would be the second RAN that is associated with the second wireless service provider. Upon receipt of the registration request, the second wireless service provider may transmit to the first wireless service provider a request to grant authorization to serve the UE. The first wireless service provider may then transmit a response to the second wireless service provider that the request is denied as the UE is not authenticated for service.

Advantageously, due to the carrying out the method 400, the first wireless service provider retains control over the unauthorized UE, as authentication is still carried out (i.e., managed) by the wireless service provider's own authentication/authorization server. Thus, at a later point in time, the first wireless service provider may authenticate the UE. The first wireless service provider may also then deliver a message to the UE, perhaps providing a new offer for service or engaging in over-the-air provisioning of some sort, among other examples.

In line with the discussion above, for instance, the first wireless service provider may update the PRL by provisioning the UE with a new PRL designed to replace the previous PRL. Alternatively, the first wireless service provider may send instructions to the UE to modify its PRL. Updating the PRL may comprise removing the first RAN from the PRL. In another example embodiment, where the existing PRL listing the first RAN as being associated with a priority level higher than the priority level of the second RAN, updating the PRL may comprise modifying the PRL to then list the second RAN as being associated with a priority level higher than the priority level of the first RAN. And certainly many other examples are possible.

Exemplary embodiments have been described above. Those skilled in the art will understand, however, that changes and modifications may be made to these embodiments without departing from the true scope and spirit of the invention.

We claim:

1. In a wireless communication system in which a user equipment (UE) is associated with a subscriber account with a first wireless service provider, the UE being provisioned with a preferred roaming list (PRL), a method comprising:
   a first radio access network (RAN) receiving from the UE a registration request, wherein the first wireless service provider is associated with the first RAN; and
   in response to receiving the registration request, (i) the first RAN attempting to authenticate the UE, and (ii) upon a failure to authenticate the UE, the first RAN updating the PRL to then list a second RAN associated with a second wireless service provider as the highest priority network in the PRL,
   wherein the PRL comprises a prioritized list of a plurality of RANs respectively associated with a plurality of wireless service providers, and wherein updating the PRL comprises a function selected from the group consisting of (a) provisioning the UE with a new PRL and (b) sending instructions to the UE to modify the PRL,
   wherein the first RAN updating the PRL in response to receiving the registration request is further conditioned upon the first RAN having received an indication that radio frequency (RF) performance issues exist for a coverage area of the first RAN,
   wherein the UE is not associated with a subscriber account with the second wireless service provider, and
   wherein the PRL initially lists the first RAN as having a higher priority than the second RAN, and wherein updating the PRL comprises updating the PRL so as to list the second RAN as having a higher priority than the first RAN.

2. The method of claim 1, wherein updating the PRL comprises removing the first RAN from the PRL.

3. The method of claim 1, wherein the first RAN updating the PRL in response to receiving the registration request is further conditioned upon the first RAN having received at least a threshold number of registration requests from the UE.

4. A non-transitory machine readable medium having stored thereon instructions executable by a processing unit to carry out functions comprising:
   receiving via a first RAN a user equipment (UE) registration request, wherein the first RAN is associated with a first wireless service provider, and wherein the UE is associated with a subscriber account with the first wireless service provider; and
   in response to receiving the registration request, updating a preferred roaming list (PRL) of the UE to then list a second RAN associated with a second wireless service provider as the highest priority network in the PRL,
   wherein the PRL comprises a prioritized list of a plurality of RANs respectively associated with a plurality of wireless service providers, and wherein updating the PRL comprises a function selected from the group consisting of (a) provisioning the UE with a new PRL and (b) sending instructions to the UE to modify the PRL,
   wherein updating the PRL in response to receiving the registration request is further conditioned upon the first RAN having received an indication that radio frequency (RF) performance issues exist for a coverage area of the first RAN,
   wherein the UE is not associated with a subscriber account with the second wireless service provider, and
   wherein the PRL initially lists the first RAN as having a higher priority than the second RAN, and wherein updating the PRL comprises updating the PRL so as to list the second RAN as having a higher priority than the first RAN.

5. The non-transitory machine readable medium of claim 4, wherein the functions further comprise, in response to receiving the registration request, attempting to authenticate the UE, wherein the updating occurs upon failure to authenticate the UE.

6. In a wireless communication system in which a user equipment (UE) is associated with a subscriber account with a first wireless service provider, the UE being provisioned with a preferred roaming list (PRL), a method comprising:
   a first radio access network (RAN) receiving from the UE a registration request, wherein the first wireless service provider is associated with the first RAN; and
   in response to receiving the registration request, (i) the first RAN attempting to authenticate the UE, and (ii) upon a failure to authenticate the UE, the first RAN updating the PRL to then list a second RAN associated with a second wireless service provider as the highest priority network in the PRL,
   wherein the PRL comprises a prioritized list of a plurality of RANs respectively associated with a plurality of wireless service providers, and wherein updating the PRL comprises a function selected from the group consisting of (a) provisioning the UE with a new PRL and (b) sending instructions to the UE to modify the PRL,
   wherein the first RAN updating the PRL in response to receiving the registration request is further conditioned upon the first RAN having received at least a threshold number of registration requests from the UE,
   wherein the UE is not associated with a subscriber account with the second wireless service provider, and
   wherein the PRL initially lists the first RAN as having a higher priority than the second RAN, and wherein updating the PRL comprises updating the PRL so as to list the second RAN as having a higher priority than the first RAN.

* * * * *